(12) United States Patent
Watson

(10) Patent No.: US 10,507,349 B2
(45) Date of Patent: Dec. 17, 2019

(54) EXERCISE FRAME SYSTEM

(71) Applicant: Cory Watson, Raleigh, NC (US)

(72) Inventor: Cory Watson, Raleigh, NC (US)

( * ) Notice: Subject to any disclaimer, the term of this patent is extended or adjusted under 35 U.S.C. 154(b) by 137 days.

(21) Appl. No.: 15/783,524

(22) Filed: Oct. 13, 2017

(65) Prior Publication Data
US 2019/0111295 A1 Apr. 18, 2019

(51) Int. Cl.
| | | |
|---|---|---|
| A63B 9/00 | (2006.01) | |
| A63B 71/02 | (2006.01) | |
| F16B 21/12 | (2006.01) | |
| A63B 17/04 | (2006.01) | |

(52) U.S. Cl.
CPC ............ *A63B 9/00* (2013.01); *A63B 17/04* (2013.01); *A63B 71/023* (2013.01); *F16B 21/12* (2013.01); *A63B 2009/006* (2013.01); *A63B 2208/12* (2013.01); *A63B 2210/50* (2013.01); *A63B 2225/09* (2013.01); *A63B 2225/093* (2013.01)

(58) Field of Classification Search
CPC ..... A63B 63/004; A63B 63/08; A63B 63/083; A63B 2225/09; A63B 2225/093; A63B 71/022; A63B 71/023; F16B 21/12; F16B 21/125; F16B 7/1472
See application file for complete search history.

(56) References Cited

U.S. PATENT DOCUMENTS

| | | | | |
|---|---|---|---|---|
| 3,097,559 | A * | 7/1963 | Chapman | F16B 21/125 411/348 |
| 3,942,904 | A * | 3/1976 | Morris | F16B 12/44 403/108 |
| 4,145,044 | A * | 3/1979 | Wilson | A63B 63/083 248/188.1 |
| 5,080,375 | A * | 1/1992 | Moosavi | A63B 63/004 473/478 |
| 5,816,932 | A * | 10/1998 | Alexander | A63B 69/3644 473/259 |
| 6,551,224 | B1 * | 4/2003 | Lim | A63B 23/0211 482/142 |
| 7,037,045 | B2 * | 5/2006 | Jones | E02D 5/523 405/249 |
| 8,292,300 | B2 * | 10/2012 | Moore, III | A63B 63/004 273/400 |
| 2005/0192126 | A1 * | 9/2005 | Remaklus | A63B 63/08 473/447 |
| 2009/0084923 | A1 * | 4/2009 | Lin | A63B 71/023 248/407 |

FOREIGN PATENT DOCUMENTS

EP 2256355 B1 10/2016

\* cited by examiner

*Primary Examiner* — Daniel J Wiley
(74) *Attorney, Agent, or Firm* — James G. Passé; Passé Intellectual Property, LLC

(57) ABSTRACT

The present invention discloses a new, more stable locking pin system for use in constructing adjustable exercise machine designs.

7 Claims, 4 Drawing Sheets

EXERCISE FRAME SYSTEM

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

Field of the Invention

The present invention relates to lock pins for exercise frame type systems. In particular, it relates to a locking pin system for use in home and commercial exercise frame type systems and applications for connectors and add on devices.

Description of Related Art

The use of a frame to support exercise positions are well known. Children's constructions are well known as jungle gyms and frames designed for adult use are called climbing frames or exercise frames. They are all basically a frame of metal or plastic designed to support the weight of the individual using it for either climbing or other exercise positions, stations, mounting of exercise equipment, and the like.

The frames are usually constructed of pipes or tubes made of metal, resins, plastic, or the like. They can be connected in a wide variety of means. Jungle gyms are frequently welded or permanently bolted together. The same is true for many adult versions of the exercise frame. The connectors for frames that can be repeatedly taken down and put up include screws, clips, springs, and the like which hold the connectors and other added equipment in place. While they work, they are still difficult to use, time consuming to use and do not always make for a steady holding in place of the connectors of the tubes or added on exercise equipment. Connecting the parts of an exercise frame that is not permanent still has issues of stability that require new solutions.

BRIEF SUMMARY OF THE INVENTION

The present invention solves the problems above, and more, as will be clear from the disclosure herein. It includes the ability to have interchangeability of frames, increase or decrease height or length of the frame, and the like. In particular, the invention relates to the novel discovery that using square or other flat sided attachment pegs in matching flat sided holes in tubing, connectors, and pieces of equipment attached to tubing improves the strength of the structure and ease of taking down and putting the frame back up. It can, in one embodiment, be used to alter overall design of the frame.

Accordingly, in one embodiment, there is an exercise frame system comprising:
 a) a plurality of tubes formed to predetermined lengths for constructing an exercise frame;
 b) a plurality of connectors for attaching tubes together to hold the frame together; and
 c) a plurality of locking pins, the locking pins comprising a flat sided shape and a length which enters a matching flat sided hole on one side of the tubing or connector and out a matching flat sided hole on the opposite side of the tubing or connector and is held in place by a cap on one end of the pin and one or more nubs on the other end of the pin, the nub and cap positioned to be outside the tubing or connector.

In another embodiment, there is a connector pin for use in connecting exercise tubing into an exercise frame, the connector pin comprising: a flat sided shape and a length which enters a matching flat sided hole on one side of the tubing and out a matching hole on the opposite side of the tubing and is held in place by a cap on one end of the pin and one or more nubs on the other end of the pin, the nub and cap positioned to be outside the tubing.

DETAILED DESCRIPTION OF THE INVENTION

Figure 1:
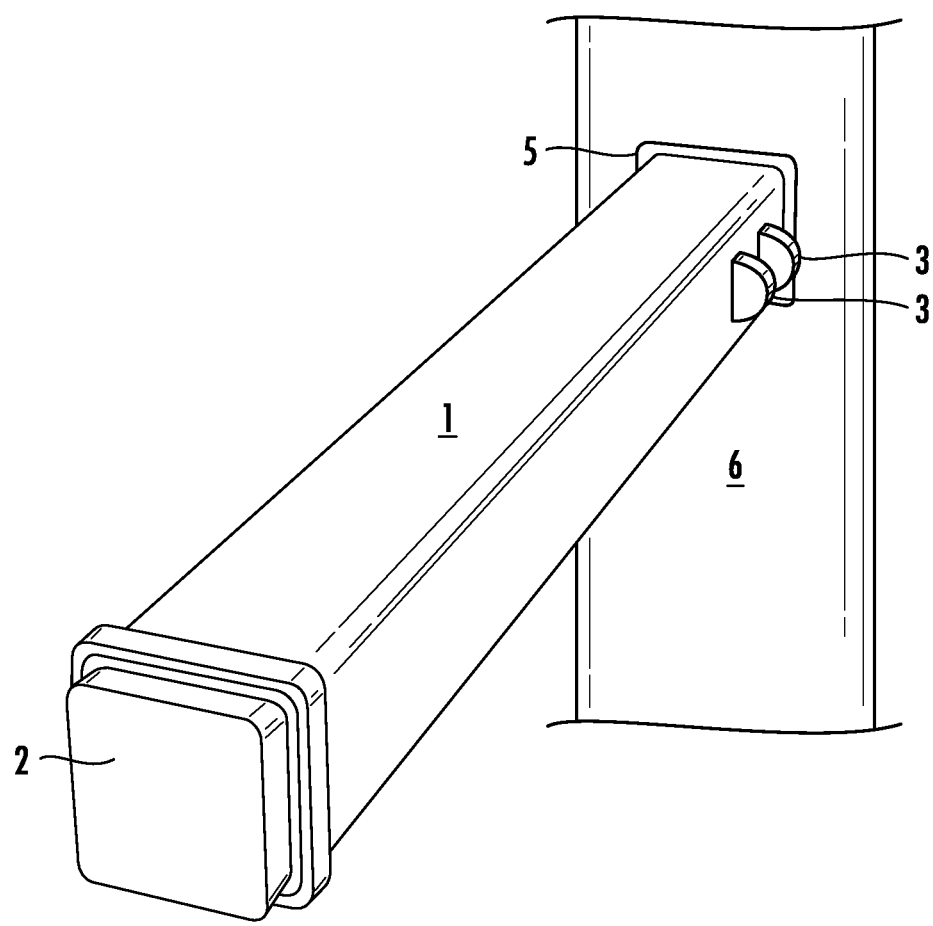
FIG. 1 is a perspective view of a locking pin and exercise frame tube.

While this invention is susceptible to embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

Definitions

The terms "about" and "essentially" mean ±10 percent.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The term "comprising" is not intended to limit inventions to only claiming the present invention with such comprising language. Any invention using the term comprising could be separated into one or more claims using "consisting" or "consisting of" claim language and is so intended.

Reference throughout this document to "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are for the purpose of illustrating certain convenient embodiments of the present invention, and are not to be considered as limitation thereto. Term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

As used herein the term "exercise frame" refers to a frame made of tubing, connectors, pins, and optional exercise equipment and accessories. The frame is designed for an individual to perform calisthenics and gymnastic exercises and the like. It also includes, but not limited to, standing on the frame to hone balance and coordination, climb, swing, or provide an enclosure for obstacle course capability. The exercise frame of the present invention is portable in that it can be assembled and taken apart repeatedly due to the nature of the removable pins of the present invention. The exercise frame can be metal, plastic, or other solid material including a mixture of different materials. One skilled in the art could build the system of the present invention in view of the disclosures herein and the known assembly and manufacturing methods.

As used herein the term "tubes" refers to tubing of rigid material (e.g. metal or plastic) sufficient to make an exercise frame. The tubing is of a length diameter and other construction parameters as known in the art. The lengths run from only about a foot or 2 to about 10 feet or more in length as needed for construction and adding equipment and/or accessories. The tubing of the present invention will include flat sided holes (rectangular or square, in two embodiments) sufficient to pass a locking pin of the invention entirely through the tubing at spots associated with attaching connectors, equipment, and accessories.

As used herein the term "connectors" refers to devices designed to connect a plurality of tubes into a frame. Examples are shown in the Figures and within the skill in the art. They can be utilized to connect 2, 3, or more tubes.

As used herein the term "locking pins" refers to a novel and unobvious aspect of the present invention. The locking pins comprise a flat sided shape, e.g. triangle, rectangle (e.g. square), hexagon, etc. and length which enters a matching hole (e.g. rectangular) on one side of the tubing or connector or accessory and out a matching hole on the opposite side of the tubing or connector or accessory and is held in place by a cap on one end of the pin and one or more nubs on the other end of the pin, the nubs and cap positioned to be outside the tubing or connector or accessory. In one embodiment, the locking pin is square.

As used herein the term "exercise equipment" refers to equipment that is attached to the exercise frame wherein the frame acts as support for the piece of equipment. The exercise equipment includes ladders, rings, weights, resistance bands, heavy bags, double-end bags, boxing equipment, and the like. The equipment can attach to the frame in the same manner as the connectors and accessories using the locking pins of the present invention.

As used herein the term "accessories" refers to things added to the frame to help with the construction, standing, use, or the like of the exercise frame. Examples include 4 foot folding bases as shown in the Figures. Examples of accessories also include regular tubing feet, end caps, fittings, pipe connectors, and the like. These accessories include perforated pipe accessories.

DRAWINGS

Figure 2:
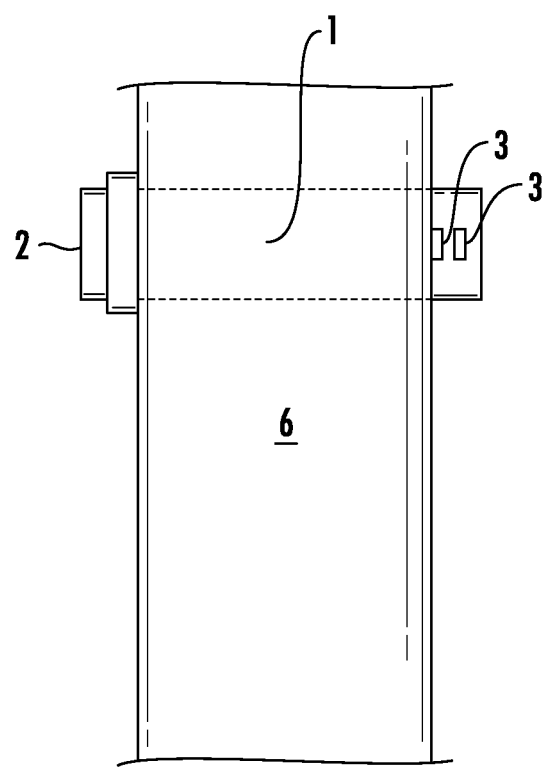
FIG. 2 is a side view of the locking pin inserted into the exercise frame tube of FIG. 1.

Now referring to the drawings, FIG. 1 is a perspective view of a rectangular locking pin of the invention being inserted into tubing of the invention. While tubing is shown, connectors and accessories are connected in the same manner. Locking pin 1 is shown with end cap 2 and a pair of nubs 3. The shape is rectangular (square in the figure) and is in the process of being inserted into rectangular hole 5 of exercise tubing 6 of an exercise frame. Other flat sided shapes as noted above are contemplated. FIG. 2 shows a side view of the same exercise tubing 6 with the locking pin 1 inserted all the way through the exercise tubing 6 with end cap 2 on one side and nubs 3 on the other side locking the locking pin 1 in place.

Figure 3:
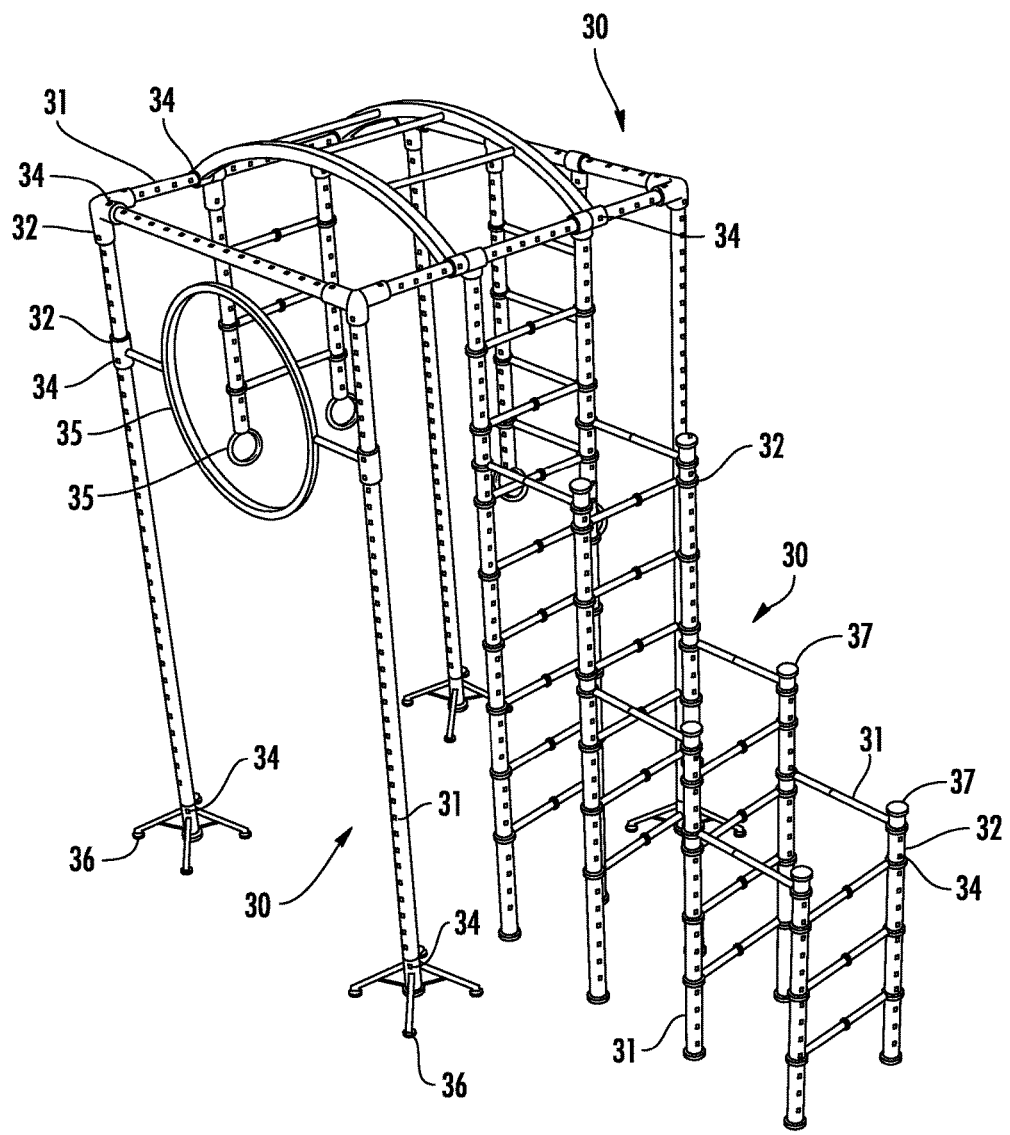
FIG. 3 is an embodiment of an exercise frame with accessories, connectors, and exercise equipment held together by locking pins.
Figure 4:
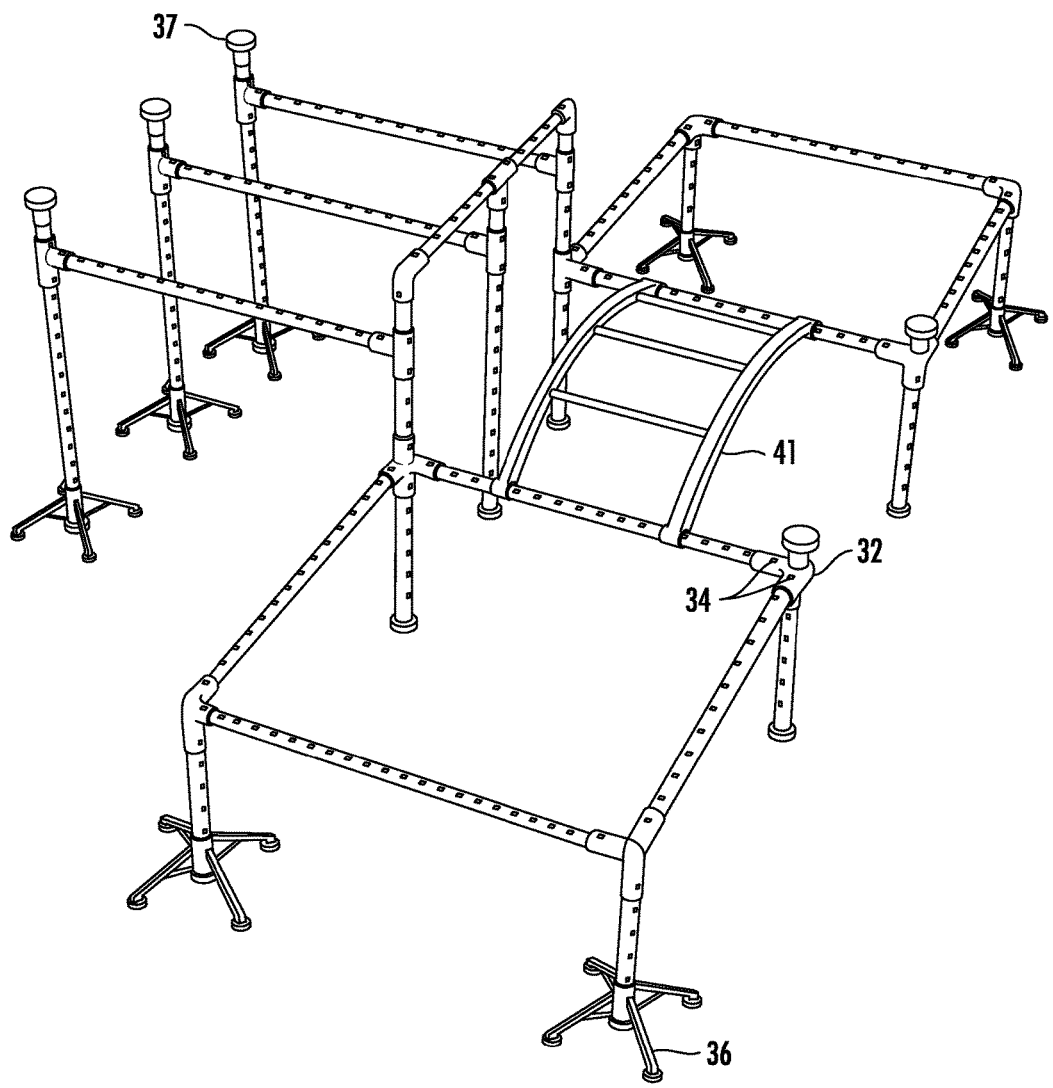
FIG. 4 is another embodiment of the exercise frame with accessories, connectors, and exercise equipment held together by locking pins.

FIG. 3 is a perspective example of an exercise frame with exercise equipment and accessories held by locking pins. In this view, frame 30 consists of a plurality of tubes 31. A number of connectors 32 attach tubes 31 together into different flat sided shapes using pins 34. Exercise equipment 35 is also attached by pins 34 as well as 4 foot bases 36 and end caps 37. FIG. 4 is another perspective example of an exercise frame utilizing the locking pins of the present invention. This embodiment shows exercise equipment a ladder 41. The remaining pieces are as in FIG. 3.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials and the like apparent to those skilled in the art still fall within the scope of the invention as claimed by the applicant.

What is claimed is:

1. A frame system consisting of:
    a) a plurality of tubes formed to predetermined lengths for constructing a frame;
    b) a plurality of connectors for attaching tubes together to hold the frame together or attach accessories to the frame: and
    c) a plurality of locking pins, the locking pins comprising at least three flat longitudinal sides and a length which enters a matching flat sided hole on one side of the tube or a tube connector and out a matching flat sided hole on the opposite side of the tube or a tube connector and is held in place by a cap on one end of the pin and one or more flexible nubs on the other end of the pin extending radially outward from one of the flat longitudinal sides, and positioned entirely on the surface of said flat longitudinal side of the locking pin, the nub and cap positioned to be outside the tube or a tube connector.

2. The frame system according to claim 1 wherein there are 2 nubs on each pin.

3. The frame system according to claim 1 wherein the pins and holes are rectangular sided.

4. The frame system according to claim 3 wherein the locking pin is square.

5. The frame system according to claim 1 which comprises exercise equipment attached to the frame using the locking pins of claim 1.

6. The frame system according to claim 1 which further comprises accessories attached to the frame using the locking pins of claim 1.

7. The frame system according to claim 6 wherein the accessories are a plurality of four foot bases used on an assembled frame.

\* \* \* \* \*

UNITED STATES PATENT AND TRADEMARK OFFICE
CERTIFICATE OF CORRECTION

PATENT NO. : 10,507,349 B2
APPLICATION NO. : 15/783524
DATED : December 17, 2019
INVENTOR(S) : Cory Watson Page 1 of 1

It is certified that error appears in the above-identified patent and that said Letters Patent is hereby corrected as shown below:

On the Title Page

Item (54) The title was changed from "EXERCISE FRAME SYSTEM" to "FRAME SYSTEM".

Signed and Sealed this
Eighth Day of September, 2020

Andrei Iancu
*Director of the United States Patent and Trademark Office*